United States Patent
Oshima et al.

(10) Patent No.: US 8,104,937 B2
(45) Date of Patent: Jan. 31, 2012

(54) HEADLIGHT SUPPORT STRUCTURE FOR A SADDLE-TYPE VEHICLE

(75) Inventors: Tadashi Oshima, Saitama (JP); Tomoko Nagamatsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 436 days.

(21) Appl. No.: 12/378,141

(22) Filed: Feb. 11, 2009

(65) Prior Publication Data
US 2009/0237948 A1 Sep. 24, 2009

(30) Foreign Application Priority Data
Mar. 19, 2008 (JP) .................................. 2008-071657

(51) Int. Cl.
*F21S 8/10* (2006.01)
(52) U.S. Cl. .......................... 362/476; 362/507; 362/538
(58) Field of Classification Search .................. 362/476, 362/474, 507, 512, 523, 538, 549
See application file for complete search history.

(56) References Cited

U.S. PATENT DOCUMENTS

| 4,390,927 A * | 6/1983 | Von Feldt ...................... 362/476 |
| 6,158,279 A * | 12/2000 | Saiki ............................... 73/493 |
| 6,332,625 B1 * | 12/2001 | Fukunaga et al. ............. 280/280 |
| 7,104,236 B2 * | 9/2006 | Ishikawa et al. ......... 123/184.31 |

FOREIGN PATENT DOCUMENTS

| JP | 59073332 A * | 4/1984 |
| JP | 1-179086 | 12/1989 |
| JP | 2003-011719 | 1/2003 |

* cited by examiner

*Primary Examiner* — Sharon Payne
(74) *Attorney, Agent, or Firm* — Carrier Blackman & Associates, P.C.; Joseph P. Carrier; William D. Blackman

(57) ABSTRACT

A headlight support structure for a saddle-type vehicle allows a headlight to be easily mounted easily on a handlebar of the vehicle. The headlight support structure includes a support member. The support member, in turn, includes: an attachment portion fixed to a mounting bracket disposed on a handlebar; a first holding portion covering the handlebar from an upward direction; and a second holding portion covering the handlebar from a forward direction. The headlight support member is supported on the handlebar by having the first and second holding portions supported on the handlebar with gaps interposed therebetween, while having the attachment portion fixed to the mounting bracket on the handlebar. The headlight is supported by first and right wall portions, extending respectively forwardly from right and left sides of a front portion of the support member.

16 Claims, 7 Drawing Sheets

US 8,104,937 B2

HEADLIGHT SUPPORT STRUCTURE FOR A SADDLE-TYPE VEHICLE

CROSS-REFERENCE TO RELATED APPLICATIONS

The present invention claims priority under 35 USC 119 based on Japanese patent application No. 2008-071657, filed on 19 Mar. 2008. The entire subject matter of this priority document, including specification, claims and drawings, is incorporated by reference herein.

BACKGROUND OF THE INVENTION

1. Technical Field of the Invention

The present invention relates to a headlight support structure for a saddle-type vehicle, which is operable for mounting a headlight and a headlight cover on a handlebar.

2. Background Art

Examples of references considered to be background art to the present invention are given below.
[Patent Document 1]—Japanese Patent Laid-open No. 2003-11719
[Patent Document 2]—Japanese Utility Model Laid-open No. Hei 1-179086

A known arrangement for an all-terrain vehicle (ATV or saddle-type vehicle), capable of running off-road or on rough terrain, has a headlight mounted on a handlebar portion of the vehicle, for illuminating an area ahead of the vehicle. A steering shaft and other parts including a bracket are mounted on the handlebar portion, and the headlight is mounted via the bracket (see, for example, Patent Document 1).

Other background art is also known, in which a gap is provided between a handlebar cover and a steering shaft mounted on a handlebar, in order to adjust an angle between the handlebar and a front fork (see, for example, Patent Document 2).

In addition to the headlight, an instrument cluster indicating, for example, vehicle speed, fuel level and rotary engine speed is also operatively mounted on the handlebar portion. Additionally, wires for the instruments, and throttle cables connected to an accelerator lever are connected to the handlebar portion. There is, therefore, a need for a structure that permits simple and easy mounting of these parts.

SUMMARY OF THE INVENTION

The present invention has been made under the foregoing circumstances, and it is an object of the present invention to provide a headlight support structure for a saddle-type vehicle allowing a headlight to be easily mounted on a handlebar.

According to an embodiment of the present invention, in a saddle-type vehicle including a headlight support member having a handlebar that steers a front wheel support a headlight and a headlight cover supported by the headlight support member so as to cover the headlight, the headlight support member includes: an attachment portion fixed to a mounting bracket disposed at the handlebar; a first holding portion covering the handlebar from an upward direction; and a second holding portion covering the handlebar from a forward direction. The headlight support member is fixed to the mounting bracket of the handlebar by the attachment portion. The headlight support member is supported by the handlebar by having the first holding portion and the second holding portion supported by the handlebar with a gap interposed therebetween. Further, the headlight is supported by a left wall portion and a right wall portion extending forwardly from a front portion at right and left of the support member.

In accordance with the foregoing arrangements, the headlight support member can be mounted by simply fixing the attachment portion to the handlebar.

Preferably, an elastic member is interposed between the headlight support member and the handlebar near the first holding portion.

In accordance with the foregoing arrangement, the headlight support member and the handlebar can be elastically supported.

Further preferably, the headlight support member is integrally formed from a plastic resin material and adapted to include a support portion for an instrument cluster and a wire path for the headlight and the instrument cluster formed therein.

In accordance with the foregoing arrangements, the support portion for the instrument cluster and various pieces of ancillary equipment including wires can be mounted with the single support member.

In the headlight support structure for the saddle-type vehicle according to an illustrative embodiment of the present invention, the headlight support member includes: the attachment portion fixed to the mounting bracket disposed on the handlebar; the first holding portion covering the handlebar from above; and the second holding portion covering the handlebar from the forward direction. The headlight support member is thereby supported on the handlebar by having the first holding portion and the second holding portion supported on the handlebar, while having the attachment portion fixed to the mounting bracket on the handlebar. In addition, the headlight is supported by the left wall portion and the right wall portion extending forwardly from the right and left sides of the front of the support member.

The headlight support member can therefore be mounted only by fixing the attachment portion to the handlebar. The first holding portion and the second holding portion are mounted in place without using, for example, a bolt, by simply positioning the first holding portion and the second holding portion from the upward and forward direction of the handlebar and with a gap interposed from the handlebar. This allows the headlight support member to be mounted on the handlebar with ease. In addition, should load act on the headlight support member from the upper or forward direction of the vehicle body, the headlight support member flexes, so that the first holding portion and the second holding portion contact the handlebar to receive the load. As a result, strength required for mounting the headlight can thereby be achieved.

The elastic member is interposed between the headlight support member and the handlebar near the first holding portion. The headlight support member and the handlebar can therefore be elastically supported, so that, for example, vehicle body vibration can be prevented from being transmitted to the support member. As a result, load acting on the headlight can be lessened.

Further, the headlight support member is formed from a plastic resin material and formed integrally with the support portion for the instrument cluster and the wire path for the headlight and the instrument cluster. Different pieces of equipment to be mounted on the bar portion can therefore be mounted with the single support member. As compared with a case in which a separate support member is individually provided for mounting each of these pieces of equipment, work can be done more easily for mounting each piece of equipment. Further, the power supply cords and actuating cables can be compactly grouped together for improved appearance.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
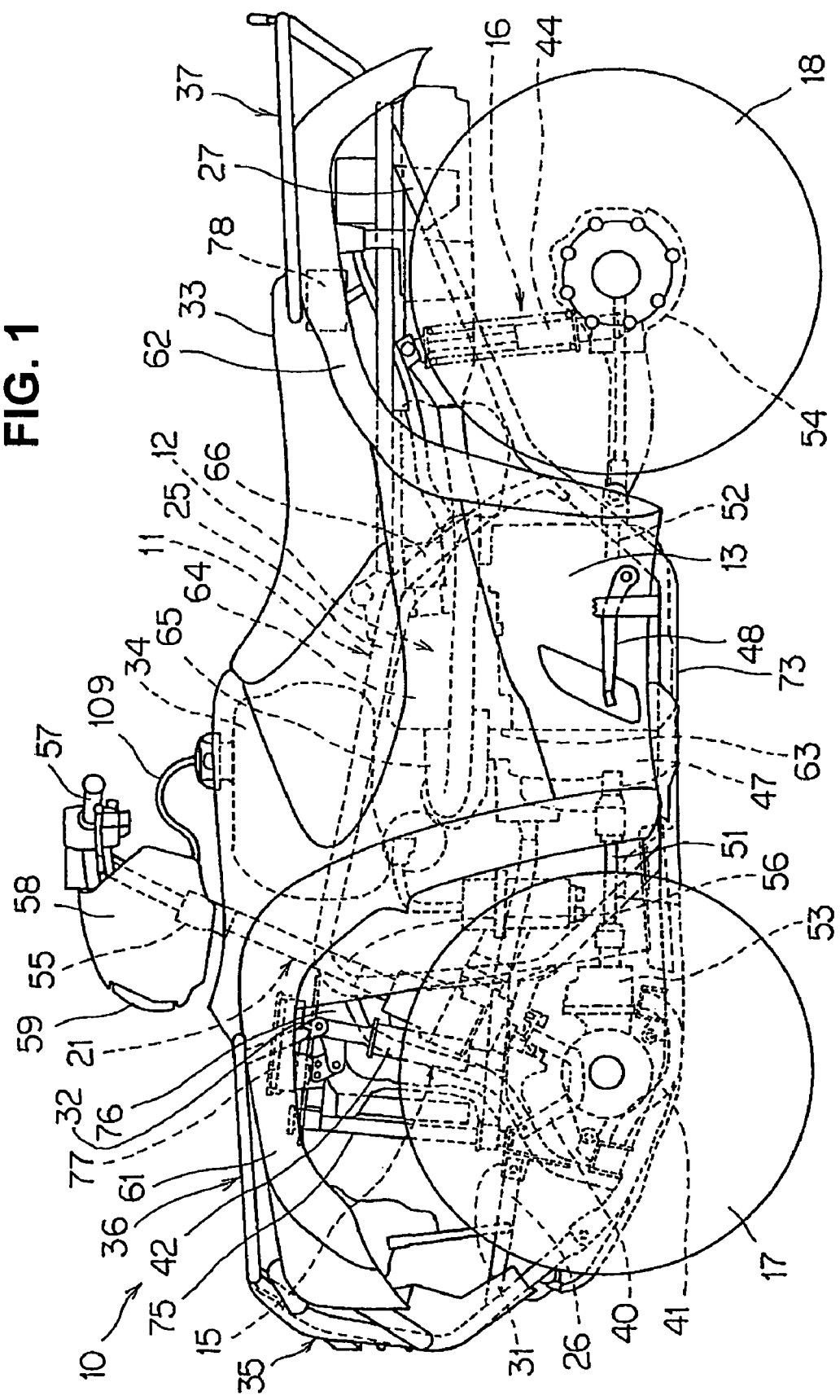
FIG. 1 is a left side elevational view showing a saddle-type vehicle according to an embodiment of the present invention.

An embodiment of the present invention will now be described, with reference to the drawings. Throughout this description, relative terms like "upper", "lower", "above", "below", "front", "back", "longitudinal", "crosswise", "vertical", and the like are used in reference to a vantage point of an operator of the vehicle, seated on the driver's seat and facing forward. It should be understood that these terms are used for purposes of illustration, and are not intended to limit the invention.

The best mode for carrying out the present invention will be described below with reference to the accompanying drawings. Throughout the present discussion, the descriptions given herein and other directional expressions are relative to the direction viewed by the rider. The drawings should be viewed with the page oriented in the direction of the reference numerals.

FIG. 1 is a side plan view of a saddle-riding type off-road vehicle according to an embodiment of the present invention.

A saddle-riding type off-road vehicle 10 (hereinafter referred to, simply, as "saddle-type vehicle 10") is a four-wheel-drive vehicle including a vehicle body frame 11, an engine 12, a power transmission system 13, a front suspension 15, a rear suspension 16, and a steering system 21. Specifically, the engine 12 is mounted at a center lower portion of the vehicle body frame 11. The power transmission system 13 is mounted on the vehicle body frame 11 and connected to the engine 12. The front and rear suspensions 15, 16 suspend left and right front wheels 17, 17 and left and right rear wheels 18, 18, respectively. The steering system 21 is mounted on the vehicle body frame 11 and connected to the front wheels 17, 17.

The vehicle body frame 11 includes a main frame 25, a front frame 26, a rear frame 27, a bracket 31, and a cross member 32. Specifically, the front frame 26 and the rear frame 27 are mounted at the front and rear of the main frame 25, respectively. The bracket 31 is mounted across the front frame 26 at a lower portion thereof. The cross member 32 is mounted across the front frame 26 at an upper portion thereof.

In FIG. 1, reference numeral 33 denotes a seat mounted on the main frame 25; reference numeral 34 denotes a fuel tank; reference numeral 35 denotes a front guard mounted on the front frame 26; reference numeral 36 denotes a front carrier mounted on the front frame 26; and reference numeral 37 denotes a rear carrier mounted at a rear portion of the main frame 25.

The front suspension 15 is an independent suspension for the left and right wheels. The front suspension 15 includes a pair of left and right front upper arms 40, 40, a pair of left and right front lower arms 41, 41, and a pair of front shock absorbers 42, 42. The front upper arms 40, 40 and the front lower arms 41, 41 are mounted so as to be reciprocally vertically movable on the vehicle body frame 11. The front shock absorbers 42, 42 are mounted across the front upper arms 40, 40 and the cross member 32. The rear suspension 16 includes a rear shock absorber 44 mounted on the vehicle body frame 11.

The power transmission system 13 includes a transmission 47, a gear change pedal 48, a front drive shaft 51, a rear drive shaft 52, a front final reduction gear 53, and a rear final reduction gear 54. Specifically, the transmission 47 is connected to an output shaft of the engine 12. The front drive shaft 51 and the rear drive shaft 52 are connected to the front and rear of the transmission 47, respectively. The front final reduction gear 53 is connected to the front drive shaft 51 and mounted on a side of the vehicle body frame 11. The rear final reduction gear 54 is connected to the rear drive shaft 52.

The steering system 21 includes a steering shaft 56 and a handlebar 57. Specifically, the steering shaft 56 is mounted at a front upper portion of the main frame 25 with a shaft holder 55. The handlebar 57 is attached to the steering shaft 56. In addition, a headlight 59 for illuminating an area ahead of the vehicle is mounted forward of the handlebar 57. The headlight 59 is covered by a headlight cover 58.

In FIG. 1, reference numeral 61 denotes a front fender covering an area upward of the front wheels 17, 17; and reference numeral 62 denotes a rear fender covering an area upward of the rear wheels 18, 18.

The engine 12 is a four-cycle engine, including a cylinder block 63, a cylinder head 64, an exhaust system 65, and a throttle body 66. The cylinder head 64 is mounted on an upper portion of the cylinder block 63. The exhaust system 65 is connected to a front portion of the cylinder head 64. The throttle body 66 is mounted at a rear portion of the cylinder head 64. A valve actuating mechanism, a piston inserted movably in the cylinder block 63, and a crankshaft connected to the piston via a connecting rod are housed in the cylinder head 64.

Additionally, an underguard 73 covering a substantially entire underside of the vehicle body is disposed under the engine 12.

A radiator 75 for cooling the engine 12 is disposed forward of the steering shaft 56. A frame 76 extending forwardly of the steering shaft 56 supports the radiator 75. An ECU 77 (electronic control part) is mounted on the frame 76 at a position rearward and upward of the radiator 75. In addition, a battery 78 is mounted at a rear portion of the vehicle body. The ECU 77 and the battery 78 are connected together by a harness to be described later. Power is thereby supplied to the ECU 77.

Figure 2:
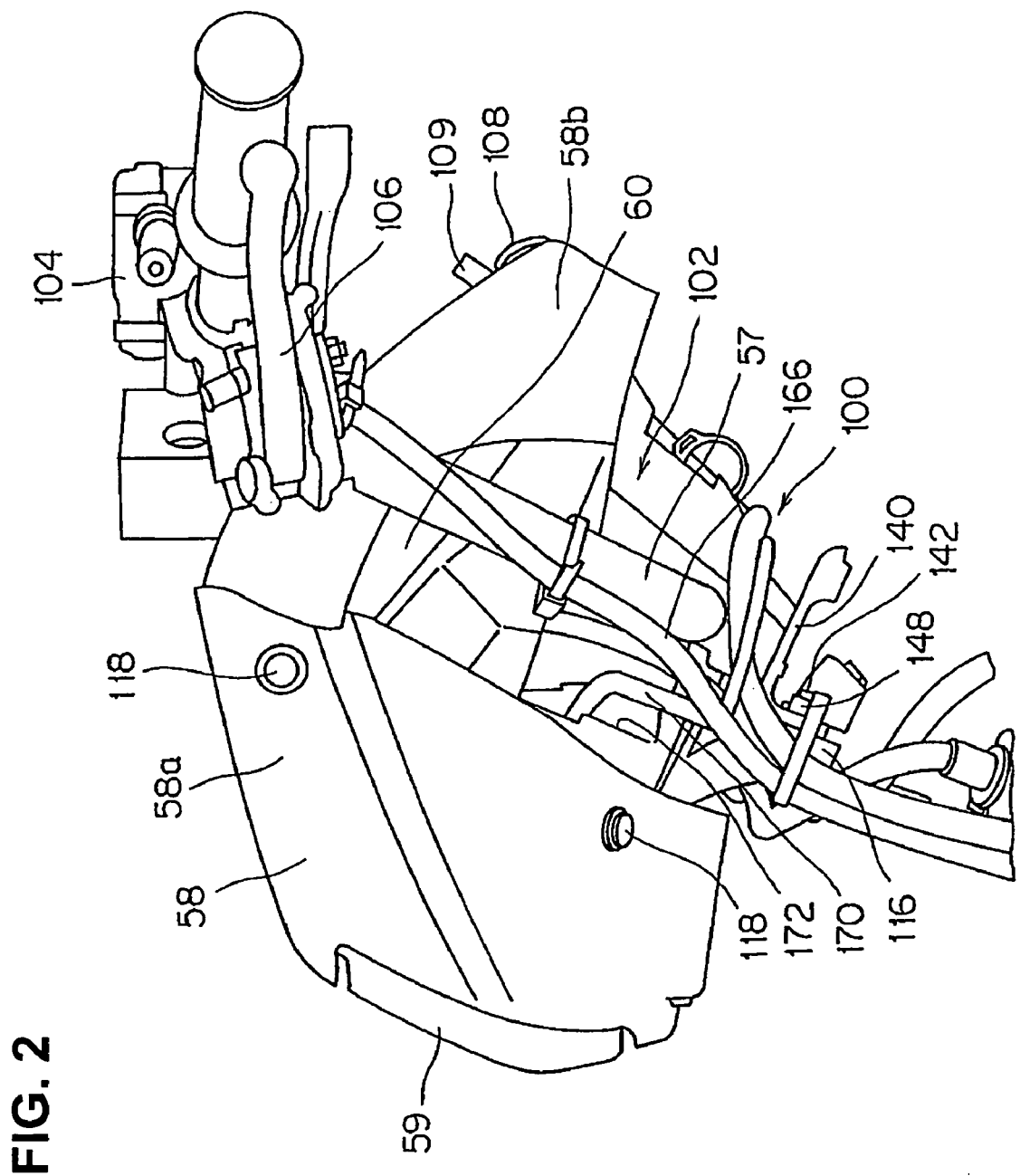
FIG. 2 is a left side elevational view showing, in an enlarged view, a handlebar portion of FIG. 1.
Figure 3:
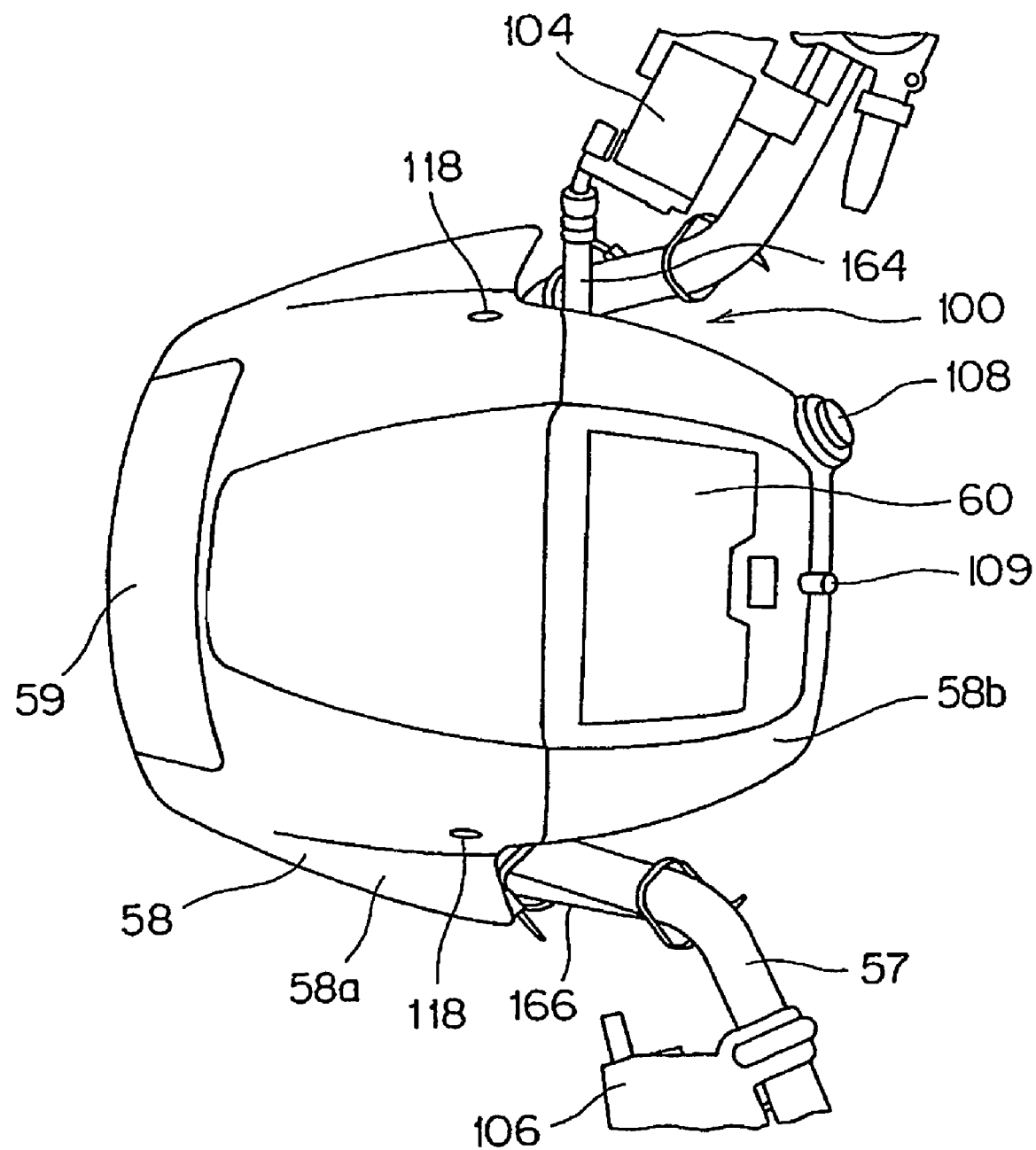
FIG. 3 is a top plan view of the handlebar portion shown in FIG. 2.

FIG. 2 is a left side detail plan view showing, in an enlarged view, a handlebar portion of the vehicle 10 of FIG. 1. FIG. 3 is a top plan view of the handlebar portion of FIG. 2, and FIG.

4 is a perspective view of the handlebar portion of FIGS. 2-3, with the headlight cover 58 removed for illustrative purposes.

Figure 6:
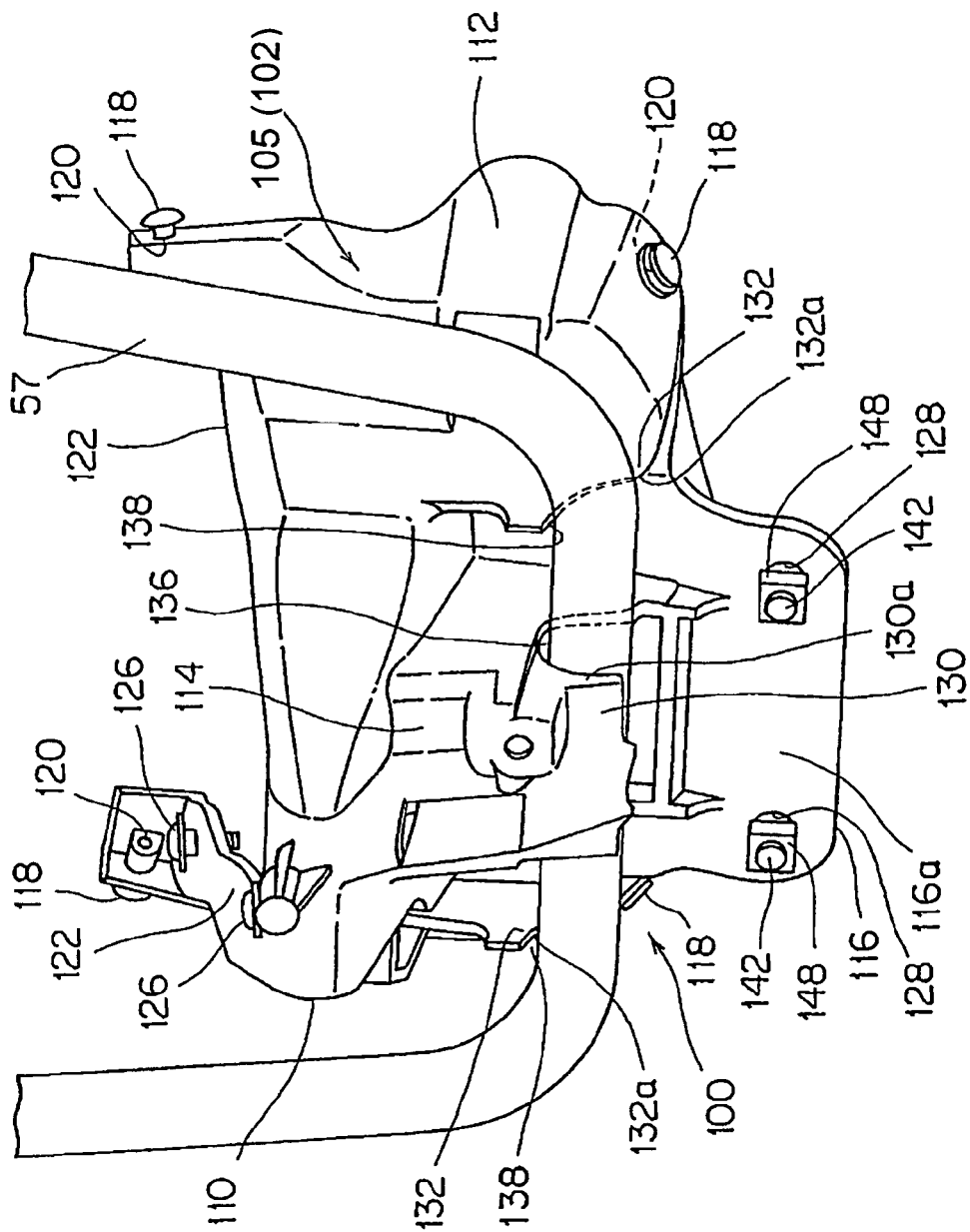
FIG. 6 is a perspective view showing the headlight support member mounted on the handlebar portion, as viewed from an obliquely rearward right side of the vehicle body.

The handlebar 57 includes a central portion formed substantially in a U-shape as seen from a front or rear view (FIG. 6). A headlight support member 102 is disposed at a U-shaped recess 100 formed by a central portion of the handlebar (hereinafter referred to as "bar portion 100").

Figure 4:
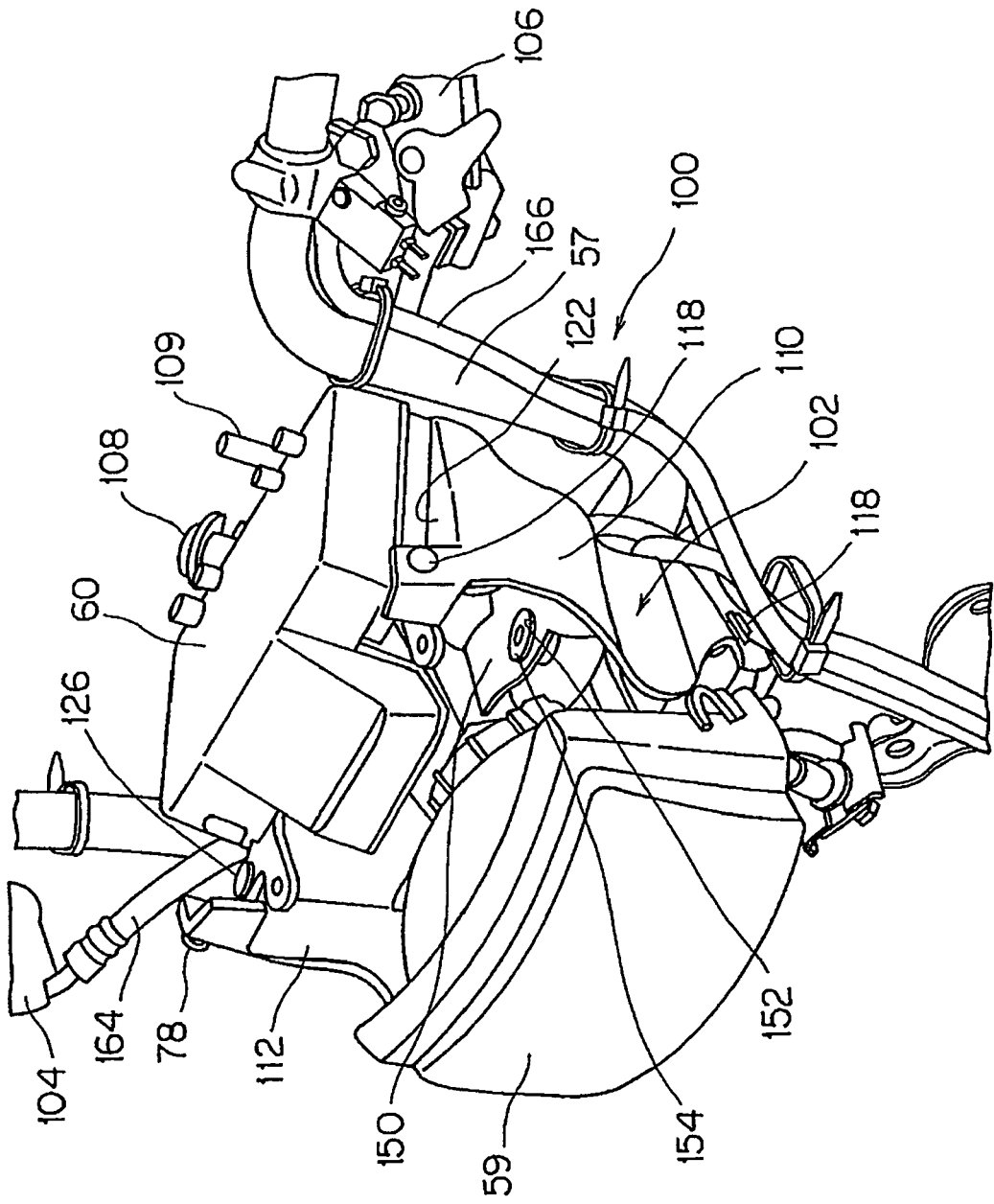
FIG. 4 is a perspective view of the handlebar portion of FIGS. 2-3, showing a headlight cover removed for illustrative purposes.

Referring now to FIGS. 2-4, the headlight 59 and an instrument cluster 60, for displaying vehicle speed and other operational information, are disposed on the headlight support member 102. The headlight cover 58 is mounted on the headlight support member 102 so as to cover the headlight 59 and the instrument cluster 60.

The headlight cover 58 can be divided into front and rear halves, including a front cover section 58a covering mainly the headlight 59, and a rear cover section 58b covering mainly the instrument cluster 60. The front cover section 58a has a relatively large central opening formed therein to permit a front portion of the headlight 59 to extend therethrough, as shown. The front cover section 58a is adapted to be removable from the headlight support member 102 without removing the rear cover section 58b.

A throttle lever 104 for operating an accelerator is disposed at a right grip portion of the handlebar 57. A rear brake control lever 106 is disposed at a left grip portion of the handlebar 57. An ignition switch 108 is disposed on the right of the instrument cluster 60, as shown in FIG. 3. A breather hose 109, connected to the fuel tank 34, is routed at a central position below the instrument cluster 60.

Figure 5:
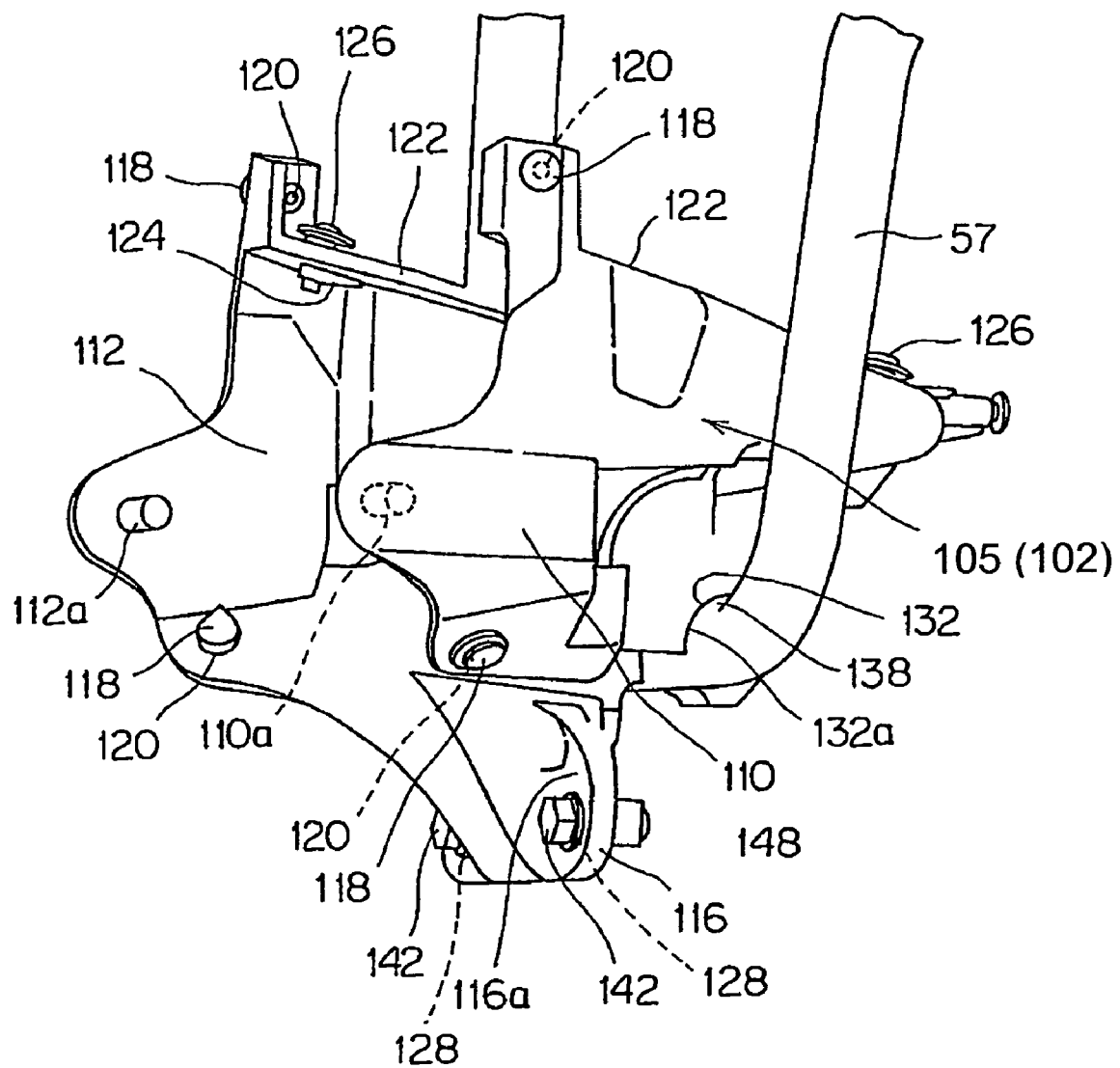
FIG. 5 is a perspective view showing a condition in which a headlight support member is mounted on the handlebar portion, as viewed from an obliquely forward left side of a vehicle body.

FIG. 5 is a detail perspective view showing a condition in which the headlight support member 102 is mounted on the bar portion 100, as viewed from an obliquely forward left side of a vehicle body. FIG. 6 is a detail perspective view showing the headlight support member 102 mounted on the bar portion 100, as viewed from an obliquely rearward right side of the vehicle body.

The headlight support member 102 is formed as a one-piece plastic resin molding defining a main support body 105 including a left wall portion 110, a right wall portion 112, a rear wall portion 114 (intermediate portion) interconnecting the left and right wall portions, and an attachment portion 116 situated at a lower end of the rear wall portion 114. Specifically, the left wall portion 110 forms a left side face of the main support body 105. The right wall portion 112 forms a right side face of the main support body 105. The rear wall portion 114 connects respective rear ends of the left and right wall portions 110, 112. The attachment portion 116 is disposed below the rear wall portion 114, at the lower end of the main support body 105.

Referring to FIG. 5, the left wall portion 110 and the right wall portion 112 are formed substantially symmetrically with each other. The left wall portion 110 and the right wall portion 112 respectively include cylindrical protrusions 110a, 112a formed thereon and extending inwardly. The headlight 59 is removably supported on the protrusions 110a, 112a (see FIG. 4). In addition, the headlight 59 is pivotally movable about the protrusions 110a, 112a, so that vertical aiming adjustments can be made.

Side faces of the left wall portion 110 and the right wall portion 112 include two fixing holes 120 each formed therein for fixing the above-described front cover section 58a in place using flexibly resilient grommets 118, as shown in FIGS. 5 and 6.

Each upper face of the left wall portion 110 and the right wall portion 112 includes a flange portion 122 (instrument cluster support portion) formed thereon and protruding inwardly on the headlight support member 102, as shown in FIGS. 4-6. The instrument cluster 60 is placed on the flange portion 122. The flange portion 122 includes two fixing holes 124 each formed therein for securing the instrument cluster 60 to the headlight support member 102 with grommets 126.

The rear wall portion 114 of the headlight support member 102 includes a first holding portion 130 and a pair of second holding portions 132 formed thereon. The first holding portion 130 is disposed at a central portion in a crosswise direction. The second holding portions 132 are disposed on both sides of the first holding portion 130.

The first holding portion 130 includes a groove 130a formed therein. The groove 130a extends upwardly so as to open downwardly and receive a central portion of the handlebar 57 therein. The first holding portion 130 is mounted such that the groove 130a covers a round bar of the handlebar 57 from an upward direction. Specifically, the groove 130a of the first holding portion 130 covers upper, front and rear sides of the handlebar 57 at the central portion thereof. With the headlight support member 102 mounted on the handlebar 57, the groove 130a is not fixed to the handlebar 57, but holds the handlebar 57 so as to oppose the handlebar 57 across a gap 136.

The second holding portion 132 includes an arcuate cutout 132a that is open downwardly and rearwardly. The second holding portion 132 is mounted such that the cutout 132a covers the round bar of the handlebar 57 from upper and forward sides thereof. In the same manner as with the groove 130a, the cutout 132a is not fixed to the handlebar 57 with the headlight support member 102 mounted on the handlebar 57. The cutout 132a holds the handlebar 57 so as to oppose the handlebar 57 across a gap 138.

In addition, a substantially flat horizontal shelf portion 150 (see FIG. 4) is formed on the headlight support member 102 at a central part of the rear wall portion 114. With the headlight support member 102 mounted on the handlebar 57, the shelf portion 150 is disposed above the handlebar 57. The shelf portion 150 is disposed such that in a mounted orientation of the headlight support member 102, a flat surface thereof faces upwardly in a vehicle vertical direction. The shelf portion 150 includes a mounting hole 152 formed at a center thereof. A rubber vibration isolation bushing 154 (elastic member) mounted on the handlebar 57 fits into the mounting hole 152, so that the vibration isolation bushing 154 is mounted so as to be situated between the mounting hole 152 and the handlebar 57.

Referring to FIGS. 5 and 6, the attachment portion 116 includes a flat surface portion 116a formed to face in a vehicle longitudinal direction. The flat surface portion 116a includes mounting holes 128 formed therein at the right and left side. The left wall portion 110 and the right wall portion 112 are extended and connected to a front side of the attachment portion 116, so that the left wall portion 110 and the right wall portion 112 serve also as reinforcement ribs.

The attachment portion 116 is secured by two bolts 142 to a mounting bracket 140 (see FIG. 2) attached to the steering shaft 56, and it will be understood that this mounting bracket 140 is also operatively attached to the handlebar 57. A rubber vibration isolation bushing 148 is interposed between each of the respective bolts 142 and the attachment portion 116. Specifically, with the headlight support member 102 mounted on the handlebar 57, the attachment portion 116 is securely secured at these two points.

As such, the headlight support member 102 is mounted such that only the attachment portion 116 and the shelf portion 150 are mounted via the rubber vibration isolation bushings 148, 154. When load acts on the headlight support member 102, the first holding portion 130 and the second holding portion 132 directly contact the handlebar 57 to help support the load.

Figure 7:
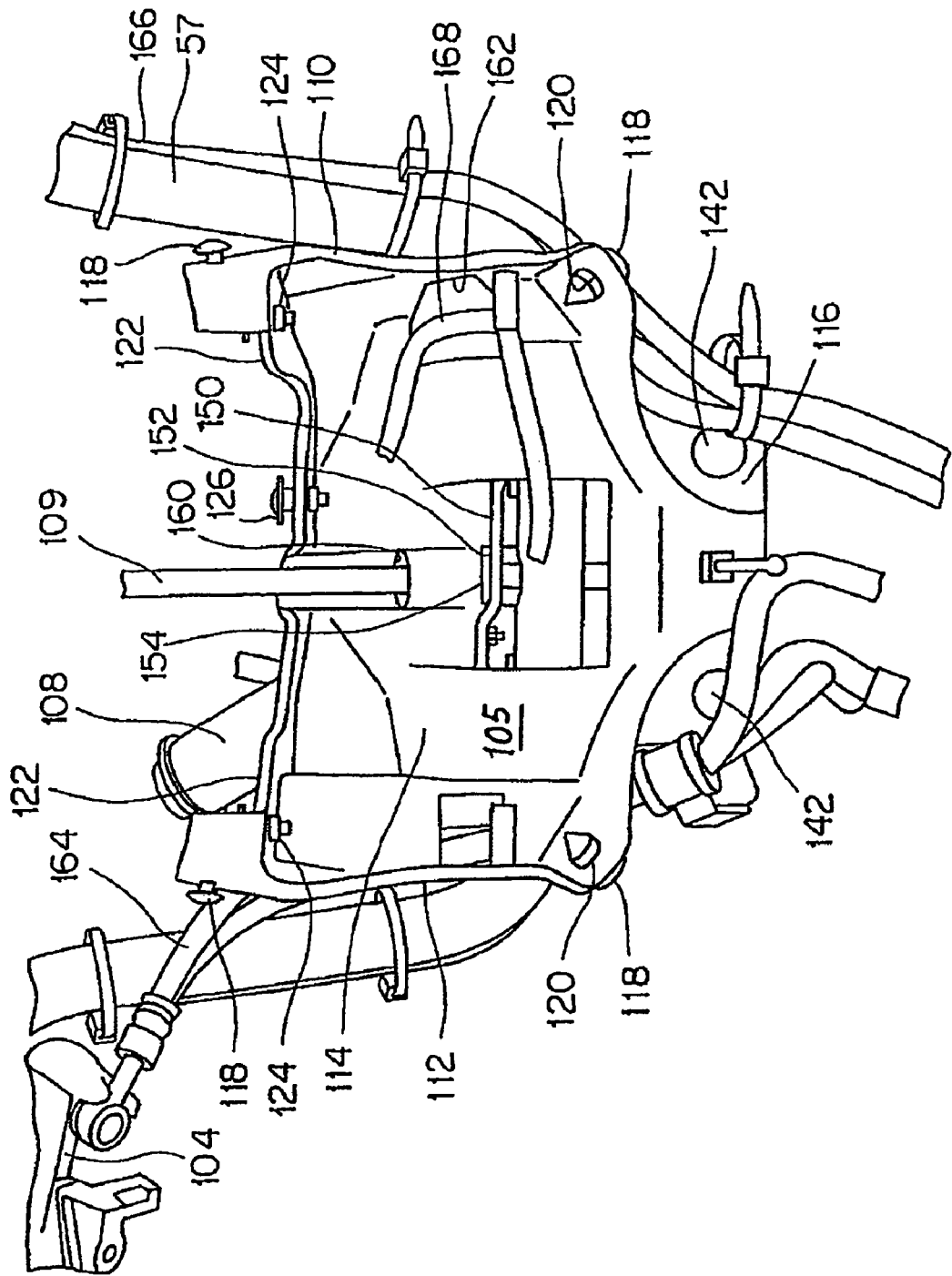
FIG. 7 is a front view showing the handlebar portion including wires of various sorts as viewed from a forward direction of the vehicle body.

FIG. 7 is a front plan view showing the bar portion 100 with the headlight support member 102 mounted thereon and also showing various associated wires and cables, as viewed from a forward direction of the vehicle body.

Wires to be connected to devices of various types mounted on the handlebar 57 and the headlight support member 102 are routed to the bar portion 100. Consequently, the headlight support member 102 is formed in a shape that takes appropriate routing of each wire into account.

Referring to FIG. 7, the headlight support member 102 has a hole 160 formed therein, through which the breather hose 109 is passed. Further, the headlight support member 102 has another hole 162 (wire path) formed therein, through which a power supply cord 168 of the instrument cluster 60 is passed. Additionally, the headlight support member 102 has another hole 172 (wire path; see FIG. 2) formed therein, through which a power supply cord 170 of the headlight 59 is passed.

As shown in FIG. 7, the left wall portion 110 and the right wall portion 112 have a lower portion that is inclined inwardly, so as to follow the contour of the handlebar 57 and be oriented toward the center of the attachment portion 116. An actuating cable 164 of the throttle lever 104 and an actuating cable 166 of the rear brake 106 are passed along this inclined portion to be routed to the underside.

In the headlight support structure for the saddle-type vehicle according to the described embodiment of the present invention, the headlight support member 102 includes: the attachment portion 116 fixed to the mounting bracket 140 disposed on the handlebar 57; the first holding portion 130 covering the handlebar 57 from the upward direction and sides; and the second holding portions 132 covering the handlebar 57 from the forward and upward directions. The headlight support member 102 is thereby supported on the handlebar 57 by having the first holding portion 130 and the second holding portions 132 supported on the handlebar 57 with the gaps 136, 138 normally interposed therebetween, while having the attachment portion 116 fixed to the mounting bracket 140 on the handlebar 57.

The first holding portion 130 and the second holding portion 132 can therefore be mounted in place without using, for example, a bolt, by simply positioning the first holding portion 130 and the second holding portions 132 close to the handlebar 57 from the above and the forward directions. This allows the headlight support member 102 to be mounted on the handlebar 57 with ease. In addition, should a load act on the headlight support member 102 from the upper or forward direction of the vehicle body, the headlight support member 102 flexes, so that the first and second holding portions 130, 132 contact the handlebar 57 to help support the load. Strength required for mounting the headlight 59 can thereby be achieved.

In addition, the headlight 59 is supported by the left and right wall portions 110, 112 extending forwardly at the left and right sides, respectively, of the headlight support member 102. The headlight 59 can therefore be easily removed and reinstalled.

The rubber vibration isolation bushing 154 is disposed between the headlight support member 102 and the handlebar 57 near the first holding portion 130. The rubber vibration isolation bushing 154 can therefore isolate vibration for the headlight support member 102 and the handlebar 57, so that, for example, vehicle body vibration can be prevented from being transmitted to the headlight support member 102. As a result, load acting on the headlight 59 can be lessened.

Further, the headlight support member 102 is formed from a plastic resin material and formed integrally with the left wall portion 110, the right wall portion 112, the flange portion 122, the hole portion 172, through which the power supply cord 170 of the headlight 59 is passed, and the hole portion 162, through which the power supply cord 168 of the instrument cluster 60 is passed. Different pieces of equipment to be mounted on the bar portion 100 can therefore be mounted with the single headlight support member 102. As compared with a case in which a support member is individually provided for mounting each of these pieces of equipment, work can be done more easily for mounting each piece of equipment. Further, the power supply cords 168, 170 can be compactly grouped together for improved appearance.

Further, each of the lower portions of the left wall portion 110 and the right wall portion 112 is inclined inwardly so as to approach the center of the attachment portion 116. The actuating cable 164 of the throttle lever 104 and the actuating cable 166 of the rear brake 106 are passed along this inclined portion to be routed to the underside. The actuating cables 164, 166 are compactly and collectively routed through the bar portion 100, so that the actuating cables 164, 166 are less easily visible from the outside, which contributes to improved appearance.

The present invention has been described with reference to the preferred embodiment; however, the present invention is not limited to the disclosed embodiment, but also encompasses those changes falling within the spirit and scope of the appended claims.

The present invention has been described as applied to the ATV vehicle capable of running on rough terrain. The present invention can nonetheless be applied to a motorcycle as long as a vehicle has a handlebar 57 and is formed such that a headlight 59 is mounted on the handlebar 57. It is thereby possible to provide a motorcycle that allows parts of the bar portion 100 to be easily mounted and offers improved appearance by making the wires look neat and tidy from the outside.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A headlight support structure for a saddle-type vehicle, the saddle-type vehicle including a handlebar that steers a front wheel of the vehicle, comprising:
  an integrally formed main support body including:
    a left wall portion;
    a right wall portion;
    a rear wall extending between the left and right wall portion;
    a lower end portion disposed between lower ends of the wall portions;
    an attachment portion disposed on the lower end portion below the rear wall and configured to be fixed to a mounting bracket disposed adjacent the handlebar;
    a first holding portion disposed centrally on the rear wall for covering the handlebar from an upward direction; and
    a pair of second holding portions disposed on the rear wall with one of the pair of second holding portions on each side of the first holding portion for covering the handlebar from a forward direction, wherein the main support body is fixed to the mounting bracket of the handlebar by the attachment portion, and the first holding portion and the pair of second holding portions are disposed proximate the handlebar with a gap interposed therebetween and provide secondary support against the handlebar to the main support body when a load is applied thereto.

2. The headlight support structure according to claim 1, wherein an elastic member is interposed between the main support body and the handlebar near the first holding portion.

3. The headlight support structure according to claim 1, wherein the main support body is integrally formed from a plastic resin material, and the main support body includes a support portion for supporting an instrument cluster thereon, and a wire path formed therein for routing power supply cables for supplying power to the headlight and the instrument cluster.

4. The headlight support structure according to claim 2, wherein the main support body is integrally formed from a plastic resin material, and the main support body includes a support portion for supporting an instrument cluster thereon, and a wire path formed therein for routing power supply cables for supplying power to the headlight and the instrument cluster.

5. The headlight support structure of claim 1, wherein the headlight cover is operatively attached to and supported by the main support body.

6. The headlight support structure of claim 1, wherein each of the left and right wall portions has a projection formed thereon extending inwardly into the main support body, and wherein the headlight is adjustably pivotally supported between the projections of the left and right wall portions.

7. The headlight support structure of claim 1, wherein the first holding portion has a groove formed therein, which opens downwardly to receive a central portion of the handlebar therein.

8. The headlight support structure of claim 1, wherein the main support body further comprises a shelf portion formed as part of the intermediate portion and disposed above the handlebar, the shelf portion having a mounting hole formed therein at a central portion thereof;

and further comprising an elastic member which extends through the mounting hole of the shelf portion, wherein the elastic member is situated between the headlight support member and the handlebar near the first holding portion.

9. A headlight support structure for a saddle-type vehicle, the saddle-type vehicle including a handlebar that steers a front wheel of the vehicle, comprising:

an integrally formed main support body including:

a left wall portion, a right wall portion, an intermediate portion interconnecting the left and right wall portions, a lower end portion disposed between lower ends of the wall portions, and an attachment portion disposed on the lower end portion below the intermediate portion and configured to be fixed to a mounting bracket disposed adjacent the handlebar;

a first holding portion disposed centrally on the intermediate portion for covering the handlebar from an upward direction; and a pair of second holding portions disposed on the intermediate portion with one of the pair of second holding portions on each side of the first holding portion for covering the handlebar from a forward direction, wherein the main support body is connected to a mounting bracket of the handlebar by the attachment portion, and the first holding portion and the pair of second holdings portion are disposed proximate the handlebar with a gap interposed therebetween and provide secondary support against the handlebar to the main support body when a load is applied thereto;

a headlight supported between the left wall portion and the right wall portion of the support member; and a headlight cover supported by the main support body so as to cover a portion of the headlight.

10. The headlight support structure according to claim 9, wherein an elastic member is interposed between the main support body and the handlebar near the first holding portion.

11. The headlight support structure according to claim 9, wherein the main support body is integrally formed from a plastic resin material, and wherein the main support body includes a support portion for supporting an instrument cluster thereon, and has a wire path formed therein for routing power supply cables for supplying power to the headlight and the instrument cluster.

12. The headlight support structure according to claim 10, wherein the main support body is integrally formed from a plastic resin material, and wherein the main support body includes a support portion for supporting an instrument cluster thereon, and has a wire path formed therein for routing power supply cables for supplying power to the headlight and the instrument cluster.

13. The headlight support structure of claim 9, wherein the headlight cover is operatively attached to and supported by the main support body.

14. The headlight support structure of claim 9, wherein each of the left and right wall portions has a projection formed thereon extending inwardly into the main support body, and wherein the headlight is adjustably pivotally supported between the projections of the left and right wall portions.

15. The headlight support structure of claim 9, wherein the first holding portion has a groove formed therein, which opens downwardly to receive a central portion of the handlebar therein.

16. The headlight support structure of claim 9, wherein the main support body further comprises a shelf portion formed as part of the intermediate portion and disposed above the handlebar, the shelf portion having a mounting hole formed therein at a central portion thereof;

and further comprising an elastic member which extends through the mounting hole of the shelf portion, wherein the elastic member is situated between the headlight support member and the handlebar near the first holding portion.

\* \* \* \* \*